United States Patent

[11] 3,565,341

| [72] | Inventor | Jerome C. Burroughs |
| | | P. O. Box 776, Loris, S.C. 29569 |
| [21] | Appl. No. | 779,042 |
| [22] | Filed | Nov. 26, 1968 |
| [45] | Patented | Feb. 23, 1971 |

[54] SPRAYING APPARATUS
9 Claims, 10 Drawing Figs.

[52] U.S. Cl. .................................................... 239/168;
239/169; 239/175; 287/98
[51] Int. Cl. .................................................... B05b 1/20
[50] Field of Search .......................................... 239/164,
165, 166, 167, 168, 169, 175; 287/91, 98

[56] References Cited
UNITED STATES PATENTS
2,910,245 10/1959 Burroughs ..................... 239/167
3,178,145 4/1965 Hein ............................. 239/168X
3,179,194 4/1965 Hunt ............................. 239/168X Primary Examiner—M. Henson Wood, Jr.
Assistant Examiner—Michael Y. Mar
Attorney—T. Russell Foster ABSTRACT: A spraying apparatus for mounting on a vehicle such as a tractor including a transversely disposed beam mounted on a frame for vertical sliding movement having spray booms pivotally mounted on each end of the beam for movement selectively into a plurality of angular positions including a laterally extending spraying position together with means for manually moving the beam slidably on the frame and means for clamping the beam to the frame in a selected vertical position.

PATENTED FEB 23 1971

INVENTOR:
JEROME C. BURROUGHS
BY T. Russell Foster
ATTORNEY

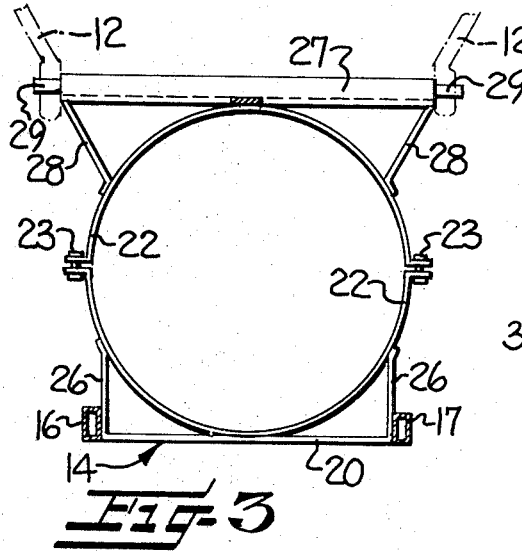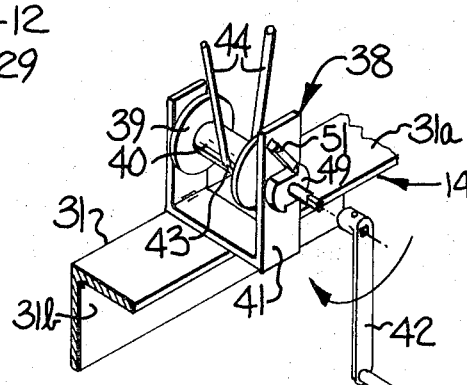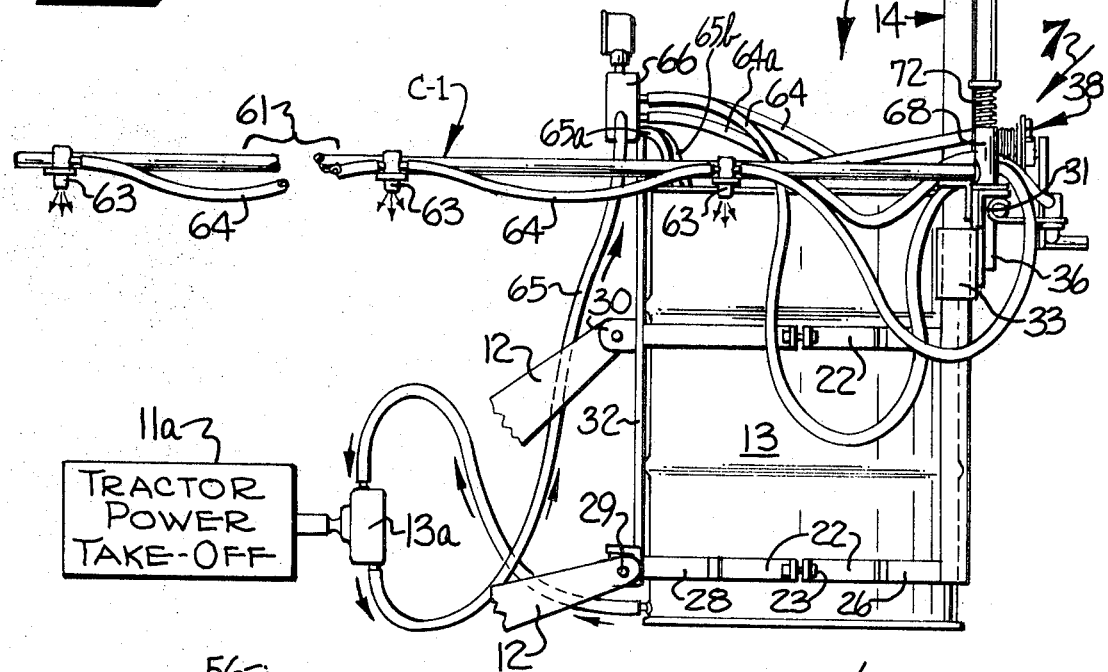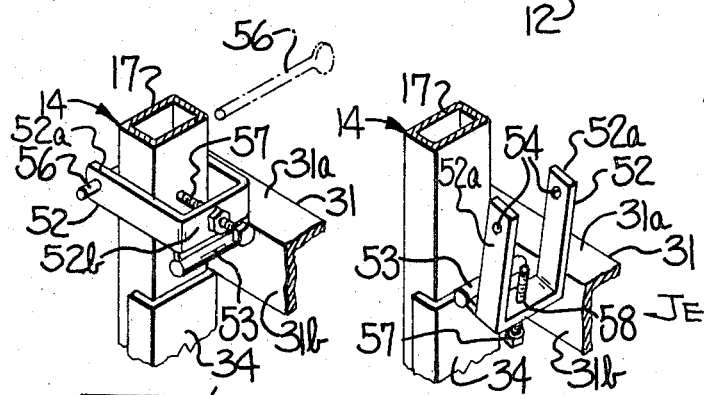

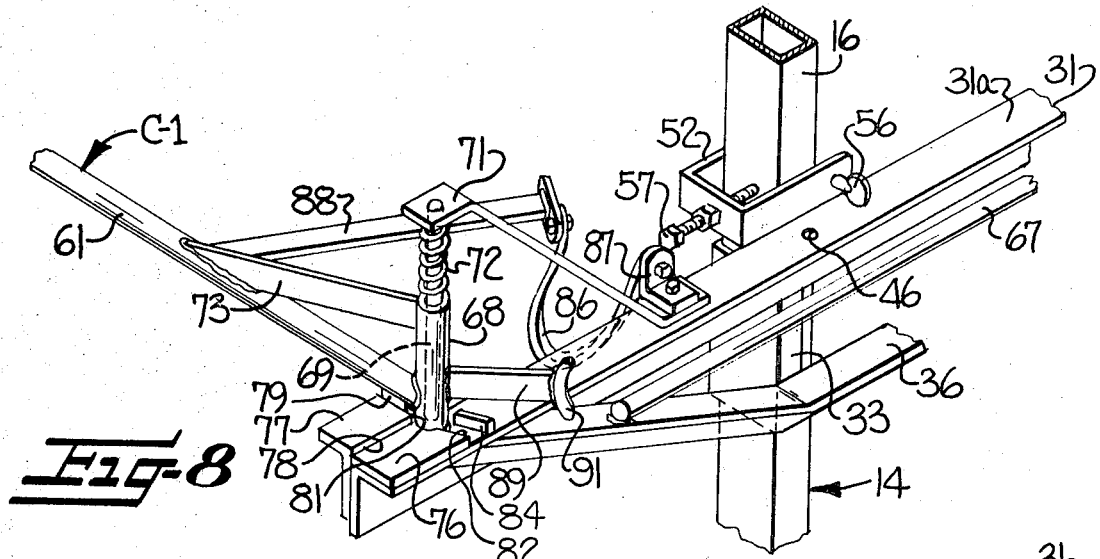

3,565,341

SPRAYING APPARATUS

This invention relates to spraying apparatus and more particularly to a vehicle mounted sprayer for spraying agricultural crops with a treating or conditioning liquid.

A well-known type of sprayer in widespread use today for large scale spraying of insecticides, liquid fertilizers and other agricultural crop treating or conditioning liquids utilizes pivotally mounted booms provided with spray nozzles and suitably supported on a frame for mounting at the rear of a self-propelled vehicle such as a farm tractor. The spray nozzles on the boom are generally supplied with spray liquid from a supply tank also supported on the tractor and the booms are spring biased against stop means into a laterally extending spraying position. Upon engagement with a fixed obstruction in the area being sprayed, the booms will pivot rearwardly under the yielding action of the biasing spring avoiding damage to the booms and subsequently returning to the spraying position when the obstruction is passed. At the same time, the booms may be pivoted into a folded or nested position adjacent the sides of the tractor when not in use.

It is well known that as crops vary in height not only during the growing season for one type of crop but as between different types of crops, proper spraying of crops with such present day spraying apparatus requires the positioning of the spray booms at varying height. While some adjustment of spraying height may be accomplished using the lift bar of the tractor on which the spraying apparatus is mounted, this provides only limited vertical adjustment. It has been proposed to slidably mount the spraying apparatus on vertical members such as posts provided with apertures for receiving retaining bolts or the like to secure the spray booms in selected vertical positions. It can be understood that such an arrangement for vertical adjustment of the sprayer not only requires considerable time and effort on the part of the operator who would be required to make frequent height adjustments during operation of the sprayer but a full range of height adjustment is still unobtainable due to the vertical spacing of the apertures. On the other hand, other present day arrangements for obtaining height adjustment of the spray boom throughout a wider range are extremely complicated and expensive in construction, a financial burden the typical farmer is unable to bear.

In such present day spraying apparatus, the booms are arranged to be folded into a storage position along the sides of the vehicle or tractor with the booms extending from the rear of the tractor forwardly. While such a folded position is generally acceptable, on some tractors the height and position of the tractor rear wheels are such that if the spray booms are in a lowered position, movement of the booms into the folded position cannot be accomplished due to interference by the wheels. Therefore, to fold the booms, the booms must be elevated to a suitable height requiring a time-consuming, laborious and inconvenient operation on the part of the operator. Furthermore, such forwardly projecting booms in the folded or storage position may be a source of interference with trees or the like in the area of the spraying operation.

Accordingly, a primary object of this invention is to provide a new and novel spraying apparatus for mounting on a vehicle such as a tractor.

Another object of this invention is to provide a new and novel spraying apparatus having pivotally mounted spray booms in which the booms may be simply and easily moved to a selected vertical position throughout a wide range for spraying agricultural crops of varying heights.

A further object of this invention is to provide a new and novel spraying apparatus for mounting on a vehicle which permits the operator to simply and quickly vary the height of the sprayer and which include both temporary and positive means for clamping the sprayer in the selected vertical position.

A still further object of this invention is to provide a new and novel spraying apparatus having spray booms which not only may be readily moved in a simple and easy manner to a laterally extending spraying position and yieldingly held therein so as to move rearwardly upon engagement with an obstruction but are movable into folded positions extending both forwardly and rearwardly of the vehicle on which the sprayer is mounted.

This invention further contemplates the provision of a new and novel spraying apparatus which is simple and inexpensive in construction, which utilizes a winch and clamp readily manipulatable by the operator to adjust the vertical position of the spray booms which may be easily mounted on a liquid supply tank for supporting on a vehicle such as a tractor and in which the spray booms may be quickly and easily moved by the operator into a spraying position and yieldingly held therein as well as into two oppositely directed folded positions in one of which the booms converge rearwardly of the tractor to minimize interference with objects in the area.

Other objects and advantages of the invention will become apparent from the following description taken in connection with the accompanying drawings.

The objects of this invention and other related objects are accomplished by providing an upstanding frame which is arranged to be supported on an associated vehicle such as a tractor. A transversely extending beam is guidably positioned on the frame in a horizontal plane for vertical sliding movement and manually operated means are operatively associated with the frame and with the beam for slidably moving the beam on the frame into a selected vertical position. A boom for supporting a plurality of spray nozzles in longitudinally spaced relationship is pivotally mounted adjacent each end of the beam for both vertical movement and for swinging movement in a substantially horizontal plane on opposite sides of the frame. A plurality of stop means are provided adjacent each end of the beam for engagement by the booms to position the booms in a plurality of angular positions in the horizontal plane corresponding to each of said stop means including a laterally extending spraying position. Resilient means are connected to the beam and to the booms for yieldingly urging the booms against each of the plurality of stop means and to yieldingly permit the booms to disengage from the stop means corresponding to the laterally extending spraying position and move pivotally rearward opposite the direction of travel of the vehicle upon engagement by the booms with an obstruction. Means are associated with the boom mounting means for yieldingly urging the booms vertically downward for engagement with the stop means selectively in one of said plurality of angular positions.

The novel features which are believed to be characteristic of the invention are set forth with particularity in the appended claims. The invention itself, however, both as to its organization and method of operation may be best understood by reference to the following description taken in conjunction with the accompanying drawings in which:

FIG. 3 is a sectional view taken substantially along line 3—3 of FIG. 2 in the direction of the arrows;

FIG. 4 is a side view of the sprayer of the invention taken substantially in the direction of the arrow 4 of FIG. 2;

FIG. 5 is a fragmentary perspective view of a portion of the sprayer of the invention taken substantially in the direction of the arrow 5 of FIG. 2;

FIG. 6 is a view similar to FIG. 5 showing the parts in another position;

FIG. 7 is a fragmentary perspective view taken substantially in the direction of the arrow 7 of FIG. 4;

FIG. 8 is an enlarged fragmentary view of a portion of the invention showing the spray booms in one folded position;

FIG. 9 is a view similar to FIG. 8 showing the spray booms in a spraying position; and FIG. 10 is a view similar to FIG. 8 showing the spray booms in a second folded position.

Figure 1:
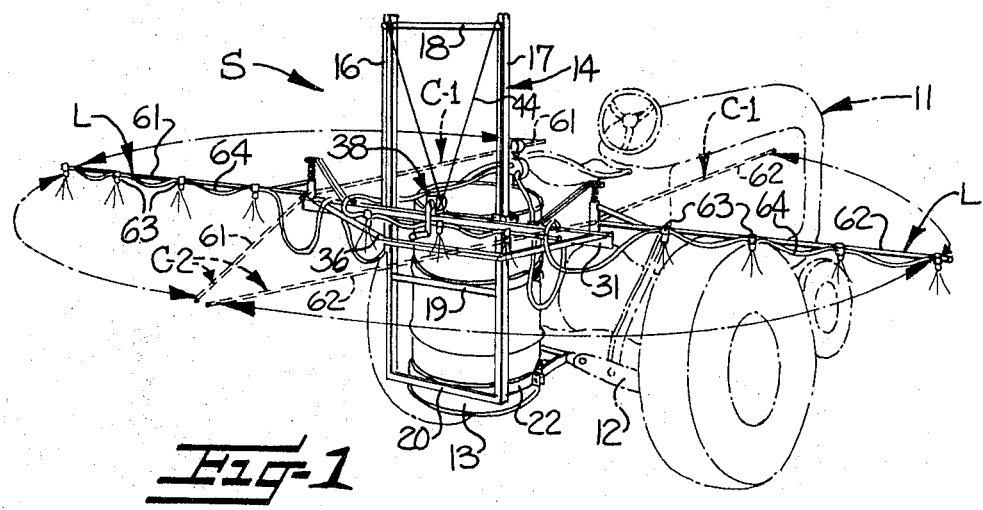
FIG. 1 is a perspective view of the sprayer of the invention in a spraying position mounted on the rear of a vehicle such as a tractor shown in broken lines.

Referring now to the drawings and to FIG. 1 in particular, there is shown a spraying apparatus constructed in accordance with the invention and designated generally by the letter S. The spraying apparatus S is arranged to be supported on a vehicle such as a tractor of any well-known type designated generally in FIG. 1 by the numeral 11 and shown in broken lines. The spraying apparatus S is preferably supported at the rear of the tractor 11 as shown on the tractor lift bars 12. As is well known, the tractor lift bars 12 are arranged to be vertically moved throughout a limited distance by a fluid pressure cylinder or the like (not shown) operated under the control of the tractor operator from the motive power means incorporated in the tractor 11. In the preferred embodiment, a liquid supply tank or drum 13 is associated with the spraying apparatus S and is arranged to contain insecticides, liquid fertilizers and other crop treating or conditioning liquids which are to be sprayed utilizing the spraying apparatus of the invention. The liquid in the drum 13 is arranged to be pumped through suitable conduit means to spray nozzles associated with the spraying apparatus S as will be explained hereinafter utilizing suitable pumping means 13a arranged to be operatively connected detachably in the conventional manner to the power takeoff 11a of the tractor 11.

Figure 2:
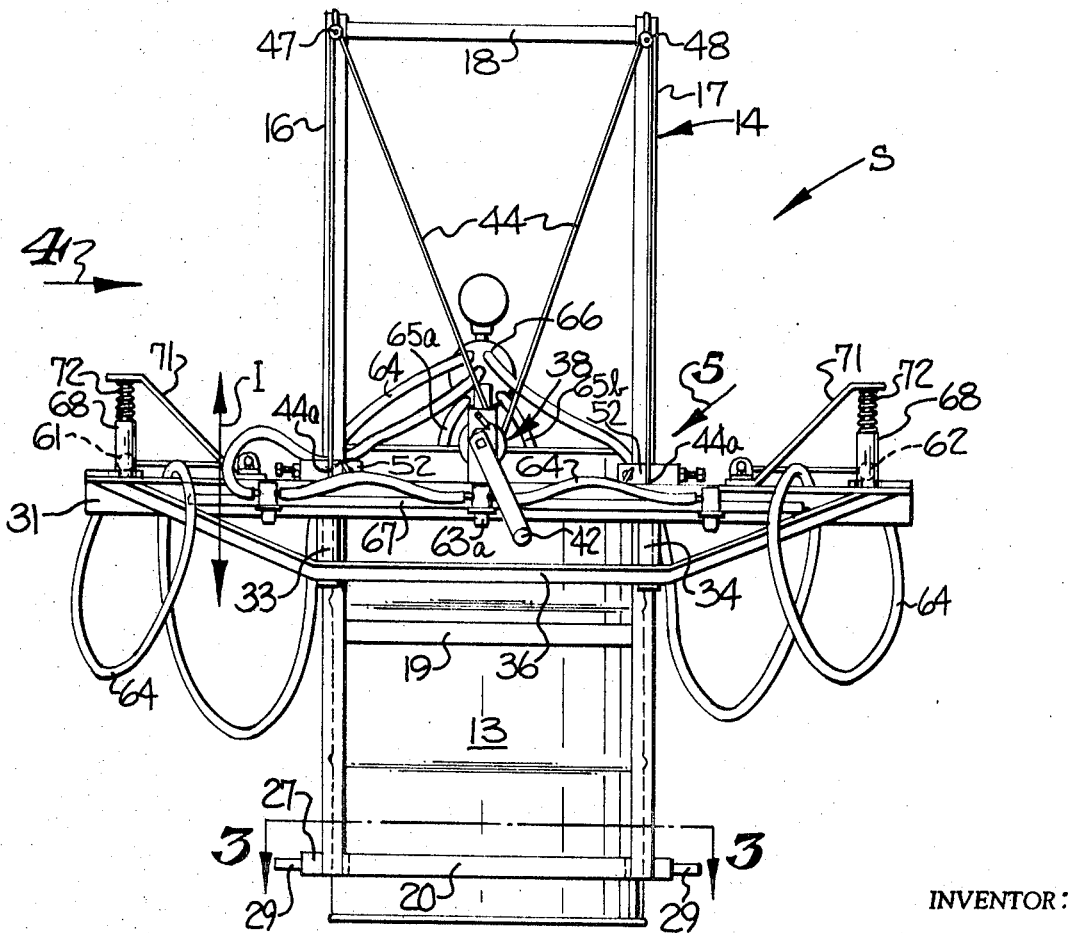
FIG. 2 is an enlarged view of the sprayer of FIG. 1 taken from the rear with the spray booms in one of the folded positions.

As specifically illustrative of the invention, the spraying apparatus S includes an upstanding frame designated generally by the numeral 14 which, in the illustrated embodiment, includes a pair of laterally spaced, vertically extending posts 16, 17 interconnected by crossmembers 18—20 as shown best in FIG. 2. Although the frame 14 may be mounted directly on the tractor 11, it is preferably secured by strap means such as vertically spaced split bands 22 to the tank 13 to form an assembly which is arranged to be supported on the tractor lift bar 12 as shown. As shown best in FIG. 3, the split bands 22 are detachably positioned in clamping relationship around the tank 13 by means such as bolts 23. The bands 22 are preferably supported on posts 16, 17 by securing the forward half of the bands by welding or the like to the crossmembers 19, 20 and to bracing members 26. A mounting bar 27 is suitably secured by welding or the like to the rear half of the lower band 22 and to bracing members 28. As shown, the mounting bar 27 is provided with end pins 29 for detachably connecting the assembly comprising the tank 13 and frame 14 to the tractor lower lifting bars 12 as shown in FIG. 3. The upper lifting bar 12 of the tractor is arranged to be detachably connected to a bracket 30 suitably secured to a vertically extending bar 32 to provide a three-point support for the assembly in the well-known manner. As shown best in FIGS. 3, 4, the bar 32 is suitably secured to the mounting bar 27 and to the rear halves of the upper band 22.

The spraying apparatus S includes a transversely extending beam 31 which may be L-shaped in cross section to provide an upper ledge portion 31a and a vertically extending portion 31b. The beam 31 is guidably positioned on the frame 14 in a horizontal plane for vertical sliding movement. More specifically, sleeve means such as sleeves 33, 34 are suitably secured by welding or the like to the beam 31 for slidably accommodating the posts 16, 17 and thereby guiding the vertical movement of the beam 31 on the posts 16, 17. Preferably, a bracing member 36 is secured by suitable means such as welding or the like to the beam 31 and sleeves 33, 34 to rigidly support the sleeves 33, 34 on the beam 31.

Manually operated means are operatively associated with the frame 14 and with the beam 31 for slidably moving the beam 31 on the frame 14 to a selected vertical position in either direction as indicated by the double arrow 1 of FIG. 2. More specifically, a winch, designated generally by the numeral 38, is suitably secured to the beam 31 and preferably to the beam upper ledge portion 31a by welding or the like as shown best in FIGS. 2, 7. The winch 38 includes a flanged drum 39 having a shaft 40. The drum 39 is rotatably supported on a U-shaped bracket 41 and is arranged to be connected to a manually operated crank 42 as shown in FIG. 7.

The drum shaft 40 is provided with a diametrically extending passage 43 through which is inserted a cable 44 such as a nylon rope or the like. The cable 44 has opposite end portions 44a and is suitably secured to the beam 31 such as by providing a retaining knot in each of the cable end portions 44a after the end portions are threaded through suitable openings 46 (as shown in FIG. 8) in the beam upper ledge portion 31a.

The rope 44 extends through the passage 43 in the drum shaft 40 intermediate the rope ends 44a, and the portions of the cable 44 between the drum 39 and the cable ends 44a are passed over pulleys 47, 48 secured to the upper ends of the posts 16, 17 as shown best in FIG. 2. Thus, a rotation of the crank handle 42 in one direction, preferably clockwise as indicated by the arrow in FIG. 7, wraps lengths of cable 44 on the drum 39 to shorten the cable and elevate the beam 31. A lowering of the beam 31 is accomplished by a counterclockwise rotation of the crank handle 42 with attendant release of the cable lengths wrapped on the drum 39.

In order to retain the beam 31 in the selected vertical position, a ratchet 49 is secured to the drum shaft 40 and is arranged to cooperate with a pawl 51 pivotally mounted on the bracket 41. Engagement of the pawl 51 with the ratchet 49 maintains the drum 39 in a selected rotary position in the well-known manner and thus temporarily retain the beam 31 in the selected vertical position. Release of the drum shaft 40 for movement of the beam 31 is obtained by a slight rotation of the crank handle 42 to permit manual disengagement of the pawl 51 form the ratchet 49.

Means are provided for positively clamping the beam 31 to the frame 14 in the selected vertical position of the beam. More specifically, as shown best in FIGS. 5, 6, a pair of U-shaped brackets 52 are pivotally mounted on the beam 31 by means such as a pivot pin 53 suitably mounted by welding or the like to the beam 31 adjacent each of the posts 16, 17. The pins 53 extend through the vertical portion 31b of the beam 31 so as to permit the brackets 52 to pivot selectively into a clamping position with the posts 16, 17 accommodated therein as shown in FIG. 5 and into an inoperative or unclamped position in spaced relationship with the posts 16, 17 as shown in FIG. 6.

Each of the brackets 52 includes spaced apart leg portions 52a in which are positioned a pair of aligned openings 54 for removably receiving a bolt 56 in the clamping position of FIG. 5. A threaded bolt 57 is also provided in each of the brackets 52 which is arranged in threaded engagement with a threaded opening 58 in the bight portion 52b of the bracket and in substantially parallel relationship with the bracket leg portions 52a. Thus, to positively clamp the beam 31 to the frame 14, brackets 52 are moved into the clamping position of FIG. 5 and the bolt 56 inserted within the aligned holes 54. Each of the threaded bolts 57 are then turned to bring their inner ends into engagement with the posts 16, 17 clamping each of the posts 16, 17 between the bolts 56, 57 thereby positively clamping the beam 31 in the selected vertical position. In order to unclamp the brackets 52 from the posts 16, 17, the threaded bolt 57 is retracted and the brackets 52 pivoted to the inoperative position of FIG. 6 so as to permit vertical movement of the beam 31 with the crank handle 42 as described above.

In order to provide for the spraying of liquid contained within the tank 13, the spraying apparatus S includes a pair of booms 61, 62 and means are provided for pivotally mounting one of the booms 61, 62 adjacent each end of the beam 31 for both vertical movement and for swinging movement in a substantially horizontal plane on opposite sides of the frame 14 as indicated by the arrows in FIG. 1. The booms 61, 62 are arranged to support a plurality of spray nozzles 63 arranged in longitudinally spaced relationship on the booms 61, 62 as shown. The spray nozzles 63 are interconnected in communication with each other and with the tank 13 through a regulator 66 by flexible conduit means 64 such as rubber hoses or the like.

In the preferred embodiment, a plurality of additional spray nozzles 63a are suitably supported on the beam 31 as shown best in FIG. 2 which are also arranged in longitudinally spaced relationship intermediate the innermost nozzles on the booms 61, 62. The nozzles 63a are also interconnected with each other and with the regulator 66 by flexible conduit means such as a hose 64a. The spray nozzles 63a are preferably supported in longitudinally spaced relationship on suitable means such as a rod 67 secured to the beam 31 for spraying the underlying ground area between the inner ends of the booms 61, 62.

In order to supply liquid to the hoses 64, 64a, the regulator 66 is connected by means of a hose 65 through the pump 13a to the bottom of tank 13. The regulator 66 also communicates with the tank 13 through auxiliary hoses 65a, 65b as shown best in FIG. 4, the hoses 65a, 65b serving as a liquid return line and liquid agitating line respectively.

As shown best in FIGS. 8—10, a sleeve 68 is mounted on the inner end of each of the booms 61, 62 and the sleeves 68 are telescopically mounted on upstanding posts 69 at each end of the beam 31 for pivotal movement of the booms 61, 62 in substantially a horizontal plane as shown in FIG. 1. Each of the pivot posts 69 is suitably supported at their upper ends by means such as a bracing member 71 connected at opposite ends to the upper end of the posts 69 and the ledge portion 31a of the beam 31 respectively.

Resilient means such as a spring 72 is positioned in surrounding relationship with each of the pivot posts 69 between the sleeves 68 and upper end of the bracing members 71 to yieldingly urge the sleeves 68 and therefore the booms 61, 62 downwardly. A bracing member 73 is also preferably provided for each of the booms 61, 62 which is connected at opposite ends by suitable means such as welding or the like to each of the booms 61, 62 and the associated sleeve 68.

A plurality of stop means are provided on the beam 31 adjacent each end for engagement by the booms 61, 62 to position the booms 61, 62 in a plurality of angular positions in the horizontal plane corresponding to each of the stop means including a laterally extending position for spraying liquid through the spray nozzles 63 as shown in FIGS. 1 and 9. More specifically, each end of the beam 31 is provided with ledge members 76, 77 which define therebetween a shoulder 78 which provides the stop means for the laterally extending position of the booms 61, 62 as indicated by the letter L in FIGS. 1 and 9. Any suitable means may be utilized to form the ledge members 76, 77 and in the illustrated embodiment, the ledge member 76 comprises a plate suitably secured to the beam ledge portion 31a. Ledge member 77 is preferably an L-shaped member suitably secured to the vertical portion 31b of the beam 31.

In order to readily move the booms 61, 62 into engagement with the stop means or shoulder 78 in the laterally extending positions L, a downwardly depending lug 79 is mounted by welding or the like on the underside of each of the booms 61, 62 adjacent the sleeves 68 for engagement with the shoulder 78 in the manner shown in FIG. 9.

In the preferred embodiment, three of such stop means are provided which are arranged in angularly disposed relationship with the shoulder 78 comprising an intermediate stop means corresponding to the laterally extending spraying position L of the booms 61, 62. The other two outer stop means are arranged on opposite sides of the intermediate stop means for engagement by the lugs 79 in two oppositely extending retracted or folded positions of the booms 61, 62 forwardly and rearwardly of the beam 31 as identified by the letters C1, C2 respectively in FIG. 1. In folded position C1, the booms 61, 62 extend substantially perpendicular to the b eam 31 and lie generally parallel to the sides of tractor 11 as shown in broken lines in FIG. 1. In the folded position C2, booms 61, 62 converge rearwardly as also shown in broken lines in FIG. 1 so as to clearly avoid engagement of the booms with an obstruction during a turning movement of the tractor 11.

In the illustrated embodiment, the two outer stop means are defined by shoulders 81, 82 on the ledge member 77, 76 which are engageable by the lugs 79 on the booms 61, 62 in the folded position C1 of FIG. 8 and the folded position C2 of FIG. 10 respectively. In the preferred embodiment, the stop means or shoulders 81, 82 are arranged to cooperate with lugs 83, 84 suitably mounted on the beam ledge portion 31a so as to define a slot therebetween for accommodating the lug 79 of the booms 61, 62 in positions C1, C2 respectively and thereby positively retain the boom in each of the folded or retracted positions.

Resilient means are provided which are connected to the beam 31 and to the booms 61, 62 for yieldingly urging the booms against the intermediate stop means or shoulders 78. More specifically, resilient means such as a rubber strap 86 is provided adjacent each end of the beam 31 and is connected at one end to the beam 31 by means such as a bracket 87 suitably secured by bolts or the like to the beam ledge portion 31a. Each of the rubber straps 86 is secured at its other end by means such as a bolt or the like to the outer end of an arm 88 extending outwardly in substantially perpendicular relationship to each of the booms 61, 62. Each of the sleeves 68 is also provided with a spacer arm 89 suitably secured thereto by means such as welding or the like having an outer end 91 for engaging the strap 86 and maintaining the strap in suitably spaced relationship with the associated parts during the movement of the booms 61, 62 into the folded position C2 as shown best in FIG. 10.

In the operation of the invention, the assembly comprising the spraying apparatus S together with the tank 13 is mounted, as explained above, on the lift arms 12 of the tractor 11 and the pump 13a connected in the well-known manner to the tractor power takeoff 11a as shown in FIGS. 1, 4. The booms 61, 62 are positioned in the laterally extending spraying position L with the boom lugs 79 yieldingly urged against the shoulders 78 by means of the rubber straps 86.

After the U-shaped clamping brackets 52 have been positioned in the inoperative position of FIG. 6, the beam 31 is then moved to the desired vertical position on the frame 14 by rotation of the crank handle 42. The pivotally mounted pawl 51 engages one of the notches on the ratchet 49 to temporarily retain the beam 31 at the selected vertical position.

As has been explained above, elevation of the beam 31 is accomplished by a rotation of the crank handle 42, preferably in a clockwise direction as viewed in FIG. 2, with the ratchet 49 overriding the pawl 51 to wind the cable 44 on the winch drum shaft 40. To lower the beam 31, the pawl 51 is manually disengaged from the ratchet 49 and the handle 42 rotated in a counterclockwise direction as viewed in FIG. 2 to unwind the rope 44 from the winch drum shaft 40 permitting the beam 31 to move downwardly under the action of gravity. Thus, together with the minor adjustment permitted by the range of vertical movement of the tractor lift arms 12, the beam 31 is moved to position the spray nozzles 63, 63a into a selected vertical position in accordance with the height of the agricultural crops to be sprayed with the liquid contained within the tank 13.

When the beam 31 has been positioned in the selected vertical position by the crank handle 42, the clamping brackets 52 are then moved into the clamping or operative position of FIG. 5, bolts 56 inserted and threaded bolts 57 moved into clamping engagement with the posts 16, 17 to positively clamp the beam 31 in this selected vertical position.

The spraying operation can then be carried out after the proper pumping pressure has been established by means of the regulator 66. The pump 13a pumps liquid in the tank 13 through the conduits 64, 64a and supplies liquid to the spray nozzles 63, 63a to spray the area between the outer ends of the booms 61, 62 as shown in FIG. 1 as the tractor 11 is moved forwardly under the control of the operator.

In the event that the booms 61, 62 are are inadvertently brought into contact with an obstruction in the area being sprayed such as a tree, they will swing rearwardly of the boom 11 as permitted by the yielding action of the straps 86 as indicated by the broken lines in FIG. 9. After the boom has moved past the obstruction, strap 86 moves it back into the spraying position so that damage to the booms 61, 62 is avoided.

If during the spraying operation, it is desirable to change the height of the spray booms 61, 62, the clamping brackets 52 may be quickly and easily released from clamping engagement with the posts 16, 17 and reclamped after the beam has been moved to the adjusted vertical position by means of the crank handle 42. It may be noted that the ends of the cable or rope 44 secured to the beam 31 permit the vertical adjustment of the beam while maintaining the beam in a substantially horizontal plane.

After the spraying operation is complete, the booms 61, 62 may then be quickly and easily moved selectively into either one of the folded or retracted positions C1, C2 of FIGS. 8, 10 respectively. Movement of the booms 61, 62 into the folded position of C1 is accomplished by raising the sleeves 68 together with the booms 61, 62 as yieldingly permitted by springs 72 so that the boom lugs 79 are elevated above the shoulder 78 permitting the booms to be swung forwardly of the tractor 11. The sleeves 68 and booms 61, 62 may then be moved downwardly again to seat the lugs 79 within the slots defined by the shoulders 81, 83 positively retaining the booms 61, 62 in substantially parallel relationship along the sides of the tractor 11 and forwardly of the beams 31 as shown in broken lines in FIG. 1 and in FIG. 8.

In the event the height of the beam 31 following a spraying operation is such that it would not be possible to swing the booms 61, 62 forwardly into folded position C1 because of interference by the wheels of tractor 11, the alternate folded position C2 permits the booms to be swing rearwardly of the beam 31 and preferably in a converging relationship as shown in FIG. 1. To fold the booms 61, 62 into position C2, the booms 61, 62 are swung rearwardly as yieldingly permitted by the rubber straps 86 with the lugs 79 sliding on plates 76 until the lugs 79 move into the slot defined by the shoulders 82, 84 accompanied by a slight downward movement of the sleeves 68 and booms 61, 62 under the urging action of spring 72. The slots defined by the shoulders 82, 84 are angularly disposed so that the booms 61, 62 converge as shown in broken lines in FIG. 1. In the preferred embodiment, the spacer arms 89 are arranged so that their outer ends engage the extended straps 86 and maintain the straps in the illustrated position of FIG. 10.

To move the booms 61, 62 from either of the folded positions C1, C2, it is only necessary to elevate the booms raising the sleeves 68 against the action of springs 72 to bring the boom lugs 79 into engagement with the shoulders 78 as described above.

While there has been described what at present is considered to be the preferred embodiment of the invention, it will be understood by those skilled in the art that various changes and modifications may be made therein without departing from the invention.

I claim:

1. Spraying apparatus of the type having liquid supply means, a plurality of spray nozzles and conduit means for conducting fluid from said supply means to said spray nozzles comprising, in combination, an upstanding frame arranged to be supported on an associated vehicle, a transversely extending beam guidably positioned on said frame in a horizontal plane for vertical sliding movement, manually operated means operatively associated with said frame and with said beam for slidably moving said beam on said frame into a selected vertical position, a pair of booms for supporting a plurality of said spray nozzles in longitudinally spaced relationship, means for pivotally mounting one of said booms adjacent each end of said beam for both vertical movement and for swinging movement in a substantially horizontal plane on opposite sides of said frame in one of three positions namely a rearwardly extending position, a forwardly extending position, and a laterally extending position, a plurality of stop means adjacent each end of said beam for engagement by said booms to position said booms in a plurality of angular positions in said horizontal plane corresponding to each of said stop means, resilient means connected to said beam and to each of said booms for yieldingly urging said booms against said stop means corresponding to said laterally extending spraying position, said resilient means being arranged to yieldingly permit said booms to disengage from said stop means corresponding to said laterally extending spraying position and move pivotally rearward in the opposite direction of travel of said vehicle upon engagement by said booms with an obstruction, and means associated with said boom mounting means for yieldingly urging said booms vertically downward for lateral engagement with said stop means selectively in one of said plurality of angular positions.

2. Spraying apparatus in accordance with claim 1 including releasable means for clamping said beam to said frame in said selected vertical position.

3. Spraying apparatus in accordance with claim 2 wherein said clamping means includes a pair of U-shaped brackets having leg portions and a bight portion interconnecting said leg portions, means for pivotally mounting said brackets on said beam adjacent one of said posts, each of said brackets having a pair of aligned openings in said leg portions, a bolt arranged to be removably positioned within said aligned openings across said leg portions, a threaded opening in the bight portion of said bracket, a threaded bolt extending through said threaded opening in substantially parallel relationship with said leg portions, said brackets being pivotally movable to an inoperative position in the absence of said removable bolt to permit said beam to be moved vertically on said posts and into an operative position for accommodating the associated post between said leg portions, said threaded bolt being engageable with one side of said associated post with the other side of said associated post engageable with said removable bolt positioned in said aligned openings to clamp said post to said bracket and clamp said beam to said posts in said selected vertical position.

4. Spraying apparatus in accordance with claim 1 wherein said frame includes a pair of laterally spaced, vertically extending posts and including sleeve means on said beam for guidably retaining said beam on said posts for said vertical movement of said beam.

5. Spraying apparatus in accordance with claim 1 wherein said manually operated means include a winch mounted on said beam, said winch including a winding drum and a handle for manually rotating said drum, a pulley on each of said posts, a cable extending through said pulleys and having ends connected to said beam, said cable being also connected to said winding drum intermediate said cable ends and said pulleys for winding said cable on said drum during the rotation of said drum with said handle to shorten the lengths of said cable between said drum and said cable ends for elevating said beam vertically, a ratchet on said drum, a pivotally mounted pawl associated with said winch for releasably engaging said ratchet to lock said drum in a selected rotary position.

6. Spraying apparatus in accordance with claim 1 wherein three of said stop means are provided, said three stop means being arranged in angularly disposed relationship to provide an intermediate stop means and an outer stop means on each side of said intermediate stop means, said intermediate stop means corresponding to said laterally extending spraying position of said booms and said outer stop means being arranged for engagement by said booms in two oppositely extending retracted boom positions forwardly and rearwardly of said beam respectively.

7. Spraying apparatus accordance with claim 6 wherein one of said outer stop means is arranged to position said booms in converging relationship rearwardly of said beam, said other stop means being arranged to position said booms in substantially parallel relationship forwardly of said beam.

8. Spraying apparatus in accordance with claim 6 wherein each of said outer stop means comprises a slot for accommodating a portion of said boom to positively retain said boom in said retracted positions.

9. Spraying apparatus in accordance with claim 1 including a liquid supply drum of cylindrical shape having an outlet, flexible conduit means for communicating said drum outlet with said spray nozzles, pumping means associated with said flexible conduit means for pumping liquid to said nozzles, strap means for mounting said frame on said drum to provide a spraying assembly, and means for supporting said assembly on said associated vehicle.